Nov. 28, 1933.  D. J. McCORMACK  1,936,767
SHAFT BEARING FOR HYDRAULIC TURBINES

Filed Sept. 14, 1931   3 Sheets-Sheet 2

INVENTOR
DANIEL J. McCORMACK
BY
ATTORNEY

Nov. 28, 1933.   D. J. McCORMACK   1,936,767
SHAFT BEARING FOR HYDRAULIC TURBINES
Filed Sept. 14, 1931   3 Sheets-Sheet 3
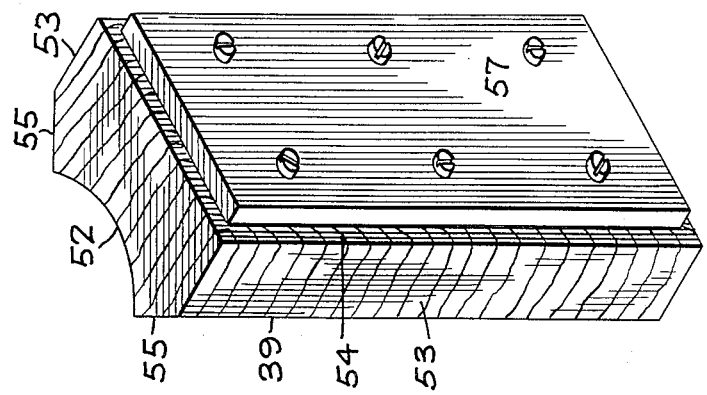
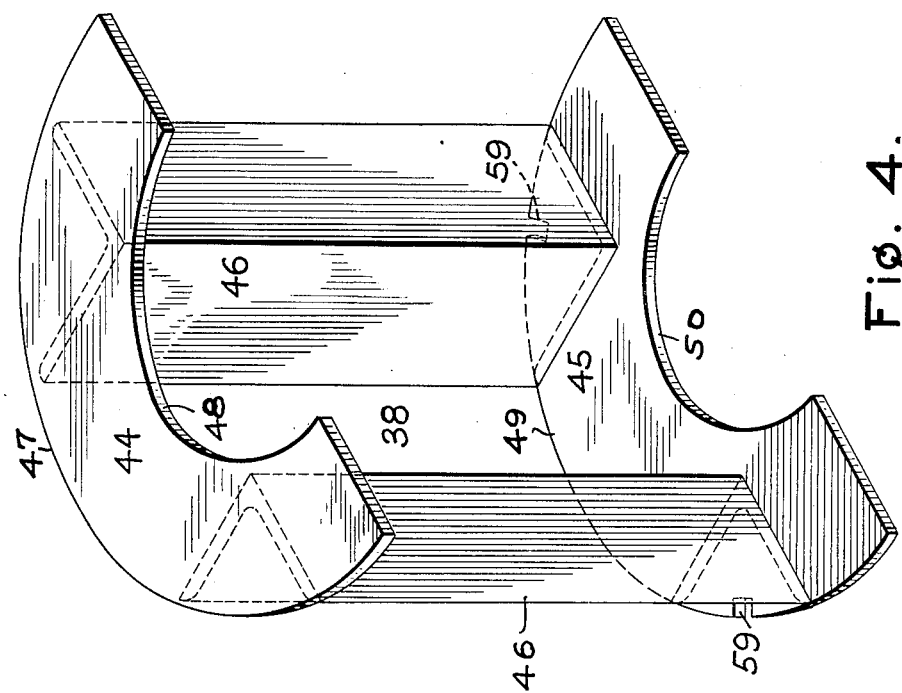
INVENTOR
DANIEL J. McCORMACK
BY
ATTORNEY Patented Nov. 28, 1933

1,936,767

UNITED STATES PATENT OFFICE 1,936,767

SHAFT BEARING FOR HYDRAULIC TURBINES

Daniel J. McCormack, York, Pa., assignor to S. Morgan Smith Company, York, Pa., a corporation of Pennsylvania Application September 14, 1931
Serial No. 562,731

4 Claims. (Cl. 308—71)

This invention relates to hydraulic turbines, and particularly to the shaft bearings therefor.

An object of the invention is to provide an improved bearing for the shafts of vertical hydraulic turbines.

Another object of the invention is to provide an improved bearing of the above type in which lignum vitæ bearing blocks are employed.

Another object of the invention is to provide an improved bearing of the above type in which the lignum vitæ bearing blocks are carried by a skeleton frame or cage in such a manner as to maintain the desired clearance between the rotating turbine shaft and the stationary parts.

Another object of the invention is to provide an improved cage or holder for the lignum vitæ bearing blocks.

Another object of the invention is to provide improved means for adjusting the bearing blocks of hydraulic turbine shaft bearings.

Another object of the invention is to provide an improved bearing of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 4 is a detail perspective of one of the segments of the bearing cage; and Figure 5 is a detail perspective looking at the rear face of one of the bearing blocks.

Figure 1:
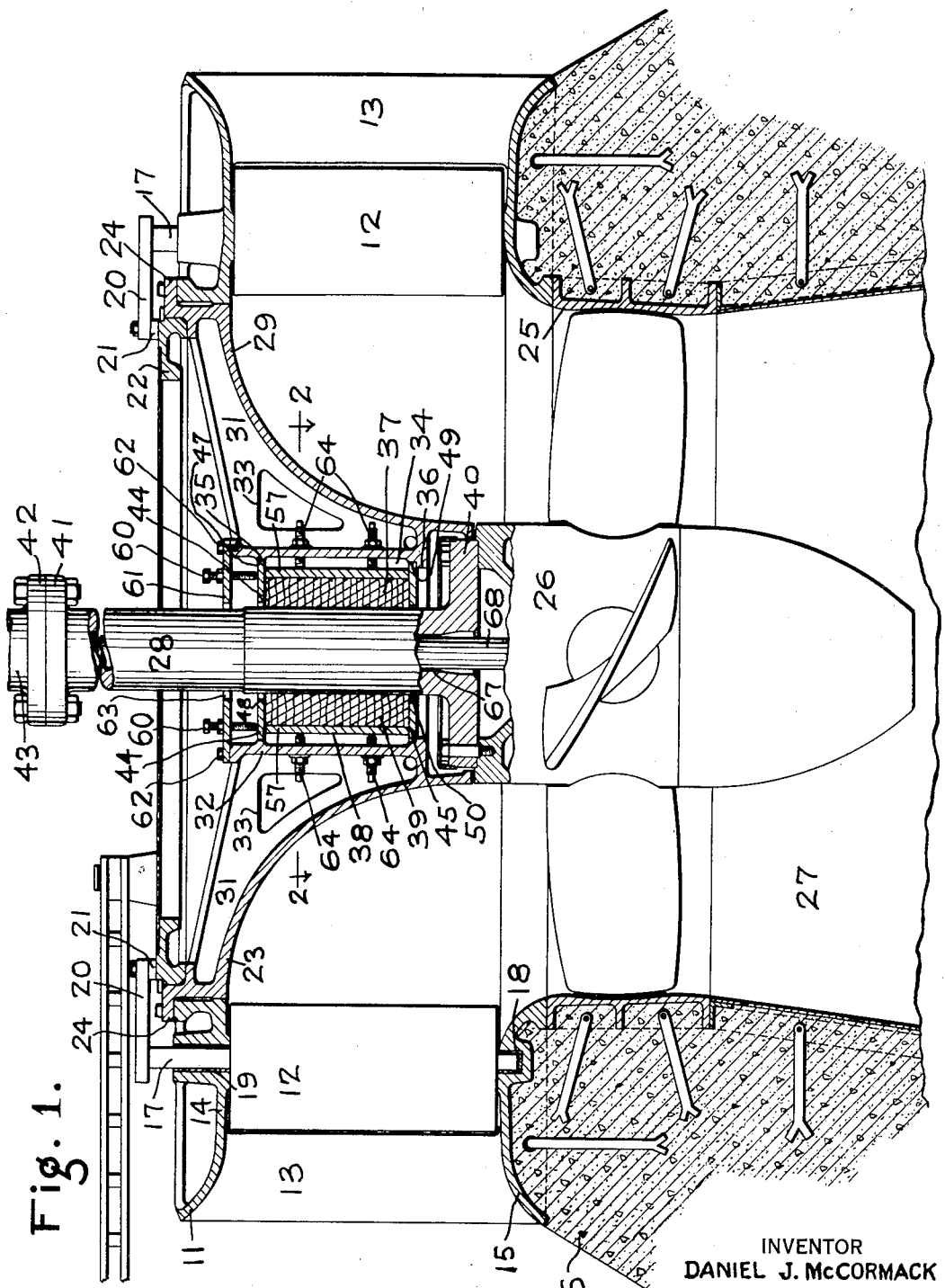
Figure 1 is a vertical section of a portion of a hydraulic turbine showing the runner shaft provided with a bearing constructed according to the present invention.

Referring to the drawings, and especially to Fig. 1, the type of turbine shown in the illustrated embodiment of the invention comprises a speed ring 11, in which are mounted an annular series of wicket gates 12 and guide vanes 13.

The wicket gates 12 are adapted to be rotated simultaneously into different angular positions to control the flow of water into the turbine, and the guide vanes 13 are so disposed relatively to the wicket gates as to intercept the water flowing into the turbine and direct the same toward the openings between the wicket gates.

The speed ring 11 is composed of an upper flange 14 and a lower flange 15, which flanges are rigidly held in spaced relation relatively to each other by the guide vanes 13. In constructing the speed ring, the upper and lower flanges and the guide vanes, are preferably cast in a single piece. The turbine is adapted to be mounted in an open flume with the lower flange 15 of the speed ring 11 set in a concrete setting 16.

Each wicket gate 12 is pivotally mounted in the speed ring 11 by means of a shaft or stem 17 which extends through the wicket gate. The lower end of the shaft 17 is mounted in a bearing 18 formed in the flange 15, and the upper end of said shaft projects upwardly through a bearing or bushing 19 mounted in the flange 14.

The upper end of each shaft 17 is provided with a gate operating arm 20 which is fixed to said shaft. The arms 20 are connected by links 21 to a gate adjusting ring 22. The gate adjusting ring is adapted to be operated in a well known manner so as to simultaneously rotate the wicket gates.

The upper portion of the turbine is closed by an annular crown plate 23 which is disposed within the speed ring 11. For the purpose of connecting the crown plate 23 to the speed ring 11, the crown plate is formed with a peripheral flange 24 which is bolted or otherwise secured to the upper flange 14 of the speed ring.

Mounted in the concrete setting 16 and constituting a downward extension of the speed ring 11, is a throat ring 25 which forms an axially directed chamber in which the runner 26 operates.

Beneath the runner 26 there is the usual draft tube 27 through which the water which passes through the runner is discharged.

The hub of the runner 26 is fixed to the lower end of a shaft 28 which extends upwards through the crown plate 23.

The crown plate 23 may be made from a single casting, and is formed with an outer wall 29 which extends from the upper flange 14 of the speed ring 11 inwardly and downwardly to the hub of the runner 26. The contour of the wall 29 is such as to provide means for directing the water which passes through the speed ring 11 toward the blades of the runner.

A plurality of webs 31, 32 are formed in the crown plate 23 for the purpose of reinforcing the outer wall thereof. The webs 31 are radially disposed and may have openings therein to reduce the weight of the crown plate, as shown at 33, Fig. 1. The web 32 may be cylindrical so as to provide a central opening 34 through the crown plate. The diameter of the opening 34 is such

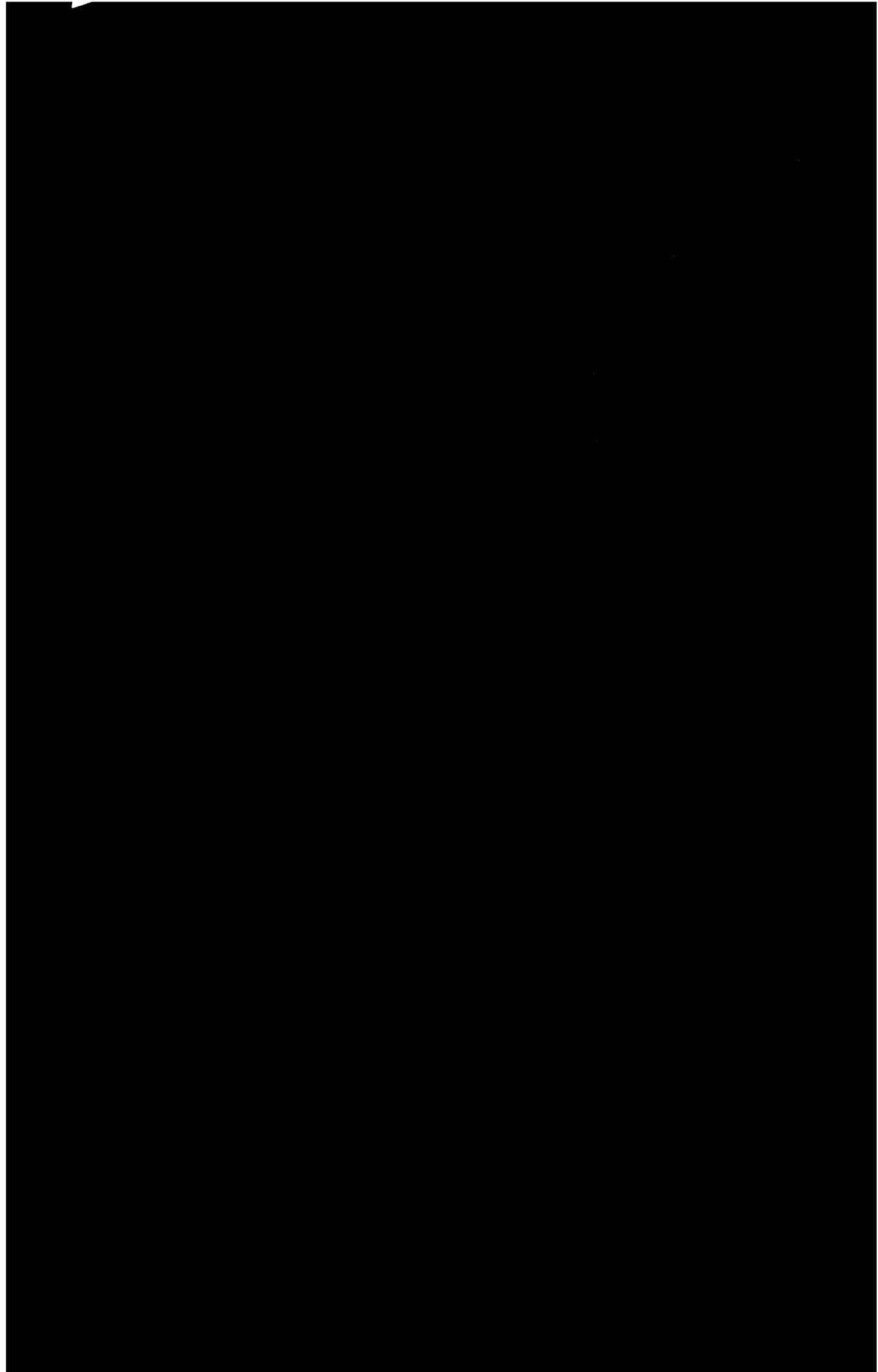

Figure 2:
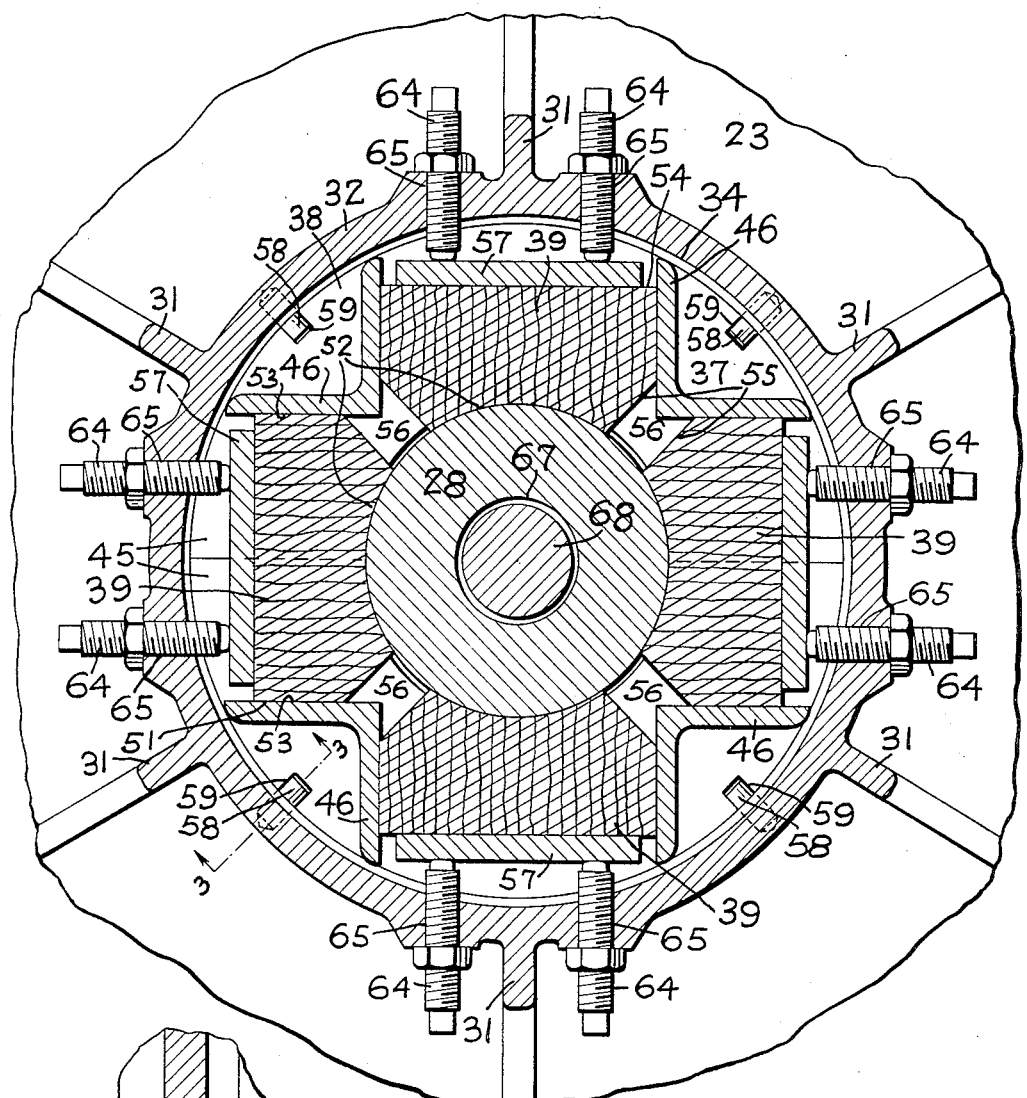
Figure 2 is an enlarged horizontal section taken on the line 2—2 of Fig. 1.
Figure 3:
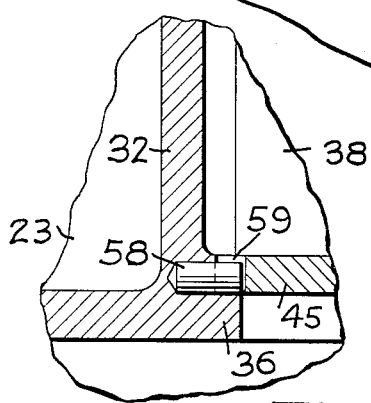
Figure 3 is a detail vertical section taken on the line 3—3 of Fig. 2.

In order to maintain the wearing surfaces of the bearing blocks 39 in engagement with the runner shaft 28, so as to give the desired running clearance, suitable means are provided for laterally adjusting the bearing blocks. The lateral adjusting means comprise a plurality of screws 64 which are mounted in threaded openings 65 formed in the web 32 of the crown plate 23, and engage with the metal plates 57 on the backs of the bearing blocks 39. A suitable number of screws 64 are arranged in a group for adjusting each bearing block, the disposition of the screws in each group being such that the wearing surfaces of the bearing blocks will be maintained evenly and uniformly in engagement with the runner shaft 28, as shown in Figs. 1 and 2.

From the foregoing it will be noted that the bearing is detachably mounted in the turbine and can be readily removed therefrom by first loosening the screws 64, and then removing the clamping plate 61 by unscrewing the screws 62. After which the two sections of the bearing cage can be readily withdrawn upwardly from the opening 34.

The present invention is applicable to turbine installations of the general class employing a runner having blades or buckets which are rotatable or adjustable so that their angle is variable with respect to the runner axis. In a turbine of this type the runner shaft 28 is formed with an opening 67 which extends longitudinally thereof, and disposed in said opening is a rod 68 for operating the runner blade adjusting mechanism. A turbine of this type is shown and described in United States Letters Patent No. 1,467,672 granted September 11, 1923 to Victor Kaplan. While in the instant case the invention is shown applied to a turbine installation of one particular type, it will be understood that the invention is not restricted thereto, since the invention is applicable to turbine installations of other types.

While one illustrative embodiment of the invention has been described in detail, it is not my intention to limit its scope to that embodiment or otherwise than by the terms of the appended claims.

Having thus described the invention, what I claim as new, and desire to secure by Letters Patent is:—

1. The combination with a rotatable shaft, of a stationary member having an opening through which the shaft projects, a wall formed in said member and surrounding the shaft in spaced relation thereto, a skeleton cage mounted in the member, said cage being composed of angle irons which parallel the shaft and plates arranged at right angles to the angle irons and integrally united thereto, pockets formed by the opposed side walls of each pair of angle irons, a bearing block disposed in each pocket and having a surface for bearing against the shaft, opposite surfaces for engaging the sides of each pair of angle irons, and a surface opposite to the shafting engaging surface, means for rigidly holding the cage in said member, and means carried by the member and engaging the bearing blocks for shifting the positions of said bearing blocks relative to the angle irons.

2. The combination with a rotatable shaft, of a stationary member having an opening through which the shaft projects and an annular wall surrounding the shaft in spaced relation thereto, a bearing for said shaft comprising a skeleton cage mounted within the annular wall of said stationary member, said cage being composed of upper and lower plates and a plurality of vertically disposed angle irons, said angle irons being integrally united to the plates, an internal flange formed on the annular wall of said stationary member for supporting the lower plate of said skeleton cage, an annular rib also formed on the interior of said annular wall for engaging the upper plate of said skeleton cage to prevent lateral displacement thereof, said flange and said rib constituting means for maintaining the cage rigid within the stationary member, the angle irons being so positioned that pockets are formed by the opposed side walls of each pair of angle irons, a bearing block disposed in each pocket and having a surface for bearing against the shaft, means carried by the stationary member for laterally adjusting the positions of said bearing blocks with respect to the rigidly held skeleton cage, and means carried by the stationary member and engaging the upper plate of said cage for clamping said cage in the stationary member.

3. The combination with a rotatable shaft, of a stationary member having an annular wall surrounding the shaft in spaced relation thereto, a bearing for said shaft comprising a skeleton cage composed of a plurality of vertically disposed angle irons and upper and lower plates integrally united to the angle irons, a flange formed at the lower portion of the annular wall of said member for supporting the lower plate of said cage, a rib formed on the interior of said wall for engaging the upper plate to prevent lateral displacement thereof, a notch formed in the lower plate, a pin carried by the stationary member and extending into said notch for preventing rotative movement of the cage relatively to the stationary member, said angle irons being positioned so that pockets are formed by the opposed side walls of each pair of angle irons, a bearing block disposed in each pocket and having a surface for bearing against the shaft, opposite surfaces for engaging the opposed side walls of the angle irons and a surface opposite to said shaft engaging surface, means carried by the stationary member for laterally adjusting the bearing blocks with respect to the cage, and means engaging the upper plate of said cage for clamping the cage in the stationary member.

4. The combination with a shaft, of a stationary casing having an annular wall surrounding the shaft and spaced therefrom, a flange formed at the lower portion of said annular wall and extending inwardly towards the shaft to provide an annular ledge, a bearing for said shaft disposed within the casing, said bearing comprising a plurality of vertically disposed angle irons, upper and lower horizontal plates integrally united to the angle irons, the lower plate resting on said annular flange and supported solely thereby, a rib formed on the interior of said casing wall for engaging the upper plate to prevent lateral movement thereof, said angle irons being positioned so that pockets are formed by the opposed side walls of each pair of angle irons, a bearing block disposed in each pocket and having a surface for bearing against the shaft, a plurality of screws carried by the stationary member for laterally adjusting the positions of said bearing blocks with respect to the angle irons, and means carried by the stationary member and engaging said upper bearing plate for urging the bearing towards its seat on said annular flange.

DANIEL J. McCORMACK.